(Model.)
H. HORTOP.
TWO WHEELED VEHICLE.
No. 260,980. Patented July 11, 1882.
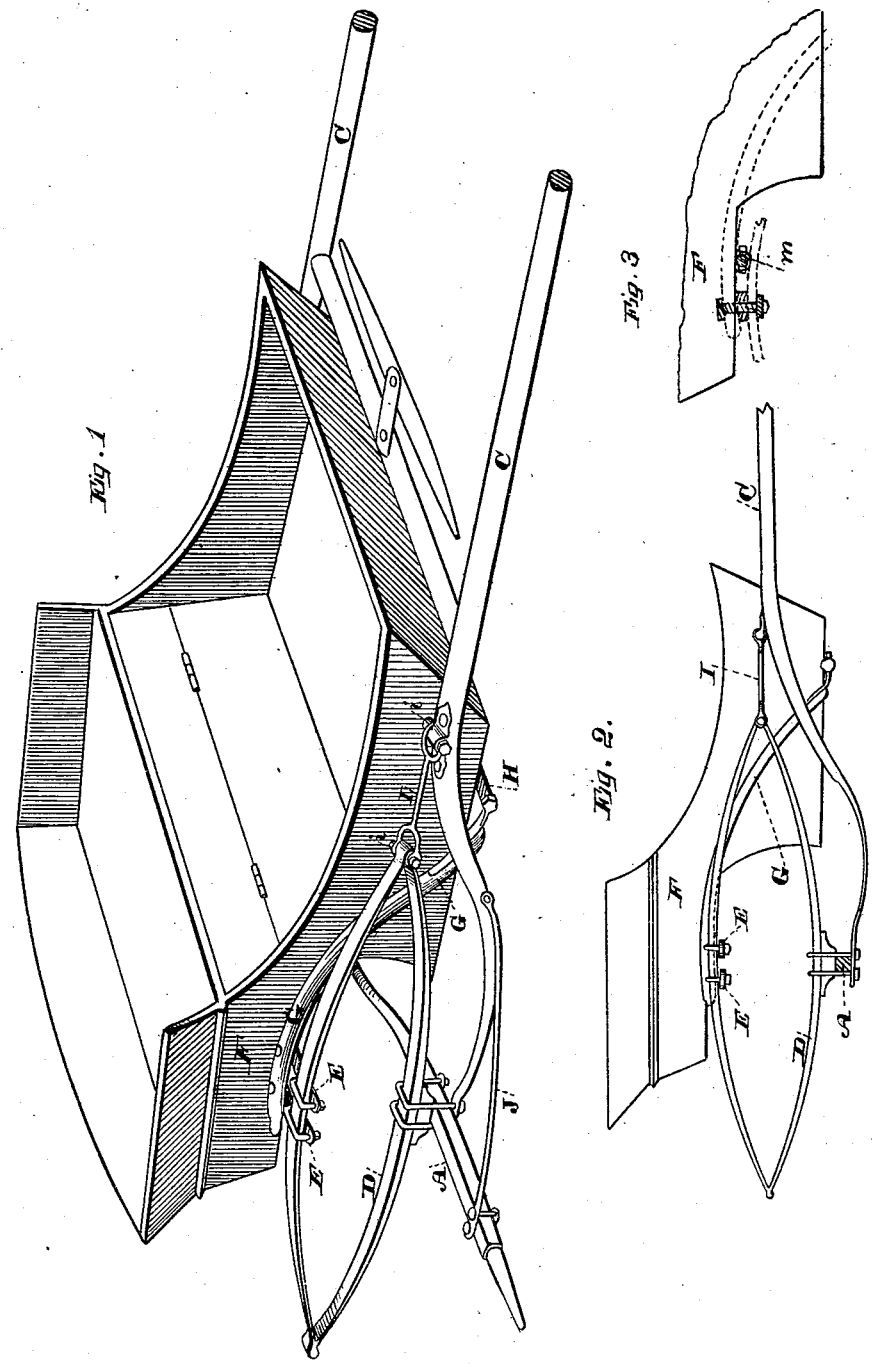
Witnesses:
R. K. Evans
C. E. Luby
Inventor:
Henry Hortop
by Dewey & Co. &
A. H. Evans & Co.

UNITED STATES PATENT OFFICE.

HENRY HORTOP, OF RUTHERFORD, CALIFORNIA.

TWO-WHEELED VEHICLE.

SPECIFICATION forming part of Letters Patent No. 260,980, dated July 11, 1882.

Application filed March 18, 1882. (Model.)

*To all whom it may concern:*

Be it known that I, HENRY HORTOP, of Rutherford, county of Napa, State of California, have invented an Improved Two-Wheeled Vehicle; and I hereby declare the following to be a full, clear, and exact description thereof.

My invention relates to that class of two-wheeled vehicles known as "carts;" and it consists in a novel arrangement of the shafts, springs, and body, together with certain peculiar connections, whereby the object of the invention is accomplished—namely, to provide against the unpleasant rocking motion which the jogging of the horse communicates to the seat and renders the employment of a cart for any purpose unadvisable.

The arrangement of parts and connections may be briefly stated as follows: The shafts are bent at each side of the lower portion of the body. They extend to and are firmly clipped to the axle. The springs are ordinary elliptical springs clipped to the axle and having cross-bars clipped to their tops. Upon these bars the body is secured, either firmly or hinged, its foot-rest or lower portion extending down and forward between the shafts. This lower portion is not attached to the shafts, but is supported upon each side by curved braces secured to each side of the body, or to a bar thereunder, and having its upper ends bolted to the cross-bars upon which the body is secured. The forward ends of the springs are connected with the shafts by links pivoted to each. All of this construction, together with its object and advantage, will hereinafter fully appear, reference being made to the accompanying drawings.

Figure 1 is a perspective view. Fig. 2 is a side view. Fig. 3 shows the modification.

Let A represent the axle, to which are firmly clipped the shafts C C. These are bent downward at each side of the lower portion of the body, and a step may be there conveniently placed. Clipped firmly to the axle are the elliptical springs D, having cross-bars E extending between their tops. Upon these bars the body F is secured, its lower portion or foot-rest extending down and forward between the shafts, but in no wise attached thereto. By this construction the body is secured to the springs alone, and this allows it to have not only the vertical movement or spring, but a forward-and-back movement, which the weight of the rider imparts to it, to counteract the same movement given it by the horse through the shafts and axle. If the body were secured to the shafts in any manner, this independent movement could not be obtained; but being secured only to the springs it is allowed to yield sufficiently to obviate the unpleasant motion it would otherwise have.

In order to furnish a support for the front of the body independent of the shafts, I have the curved supports or braces G. The upper ends of these supports are bolted to the cross-bars E at each side of the body; thence they curve downwardly by the side of the body, between it and the springs, though independent of both, and are secured to the projecting ends of a brace or bar, H, secured under the front of the body. While giving support to the front portion of the body, these braces G, by being secured to the cross-bars E, allow the body to be affected by the springs, as explained.

In order to support the springs D and establish some connection between them and the shafts for greater security, I have the links I. These have forked ends, the arms of which are journaled upon bolts or shafts $i$, one in the forward end of the springs and the other secured, as shown, upon the shafts. The links are therefore pivoted at both ends, and do not interfere with the independent motion of the springs and body. They connect the shafts with the springs, and thus prevent undue strain upon either, furnishing also a safeguard if the shaft should break from the axle.

J represents a diagonal brace, extending from the shaft to the axle.

It is obvious that, instead of the pivoted connecting-link I, a spring might be employed to effect a like result; but I consider the construction here shown preferable, as affording greater security.

I have herein described the body F as being attached securely and firmly to the cross-bars E. In the modification shown in Fig. 3 I hinge the body, as shown at $m$, to one of the cross-bars—the first, for example—which is rounded to form a good bearing and allow it to clear the other bar by having said bar lower down. The effect of this will be to give to the body a further independent movement, as it will be affected by whatever spring there may be in the curved braces G.

If a cart should be constructed adapted to be entered from behind, and having an opening for that purpose, the cross-bars E would not have to extend across, but might be supported in any suitable manner.

The cross-bars E (here shown as clipped to the springs) may be adjusted forward or back thereon by loosening the securing nuts and yokes and securing them again, so that the body may always be placed in equilibrium to suit each particular case.

The entire construction of the cart is simple and economical. It is not liable to get out of order, the parts being nicely fitted, and furnishing strength and durability.

Having thus described my invention, what I claim as new, and desire to secure by Letters Patent, is—

1. In a two-wheeled vehicle, the combination of shafts rigidly secured to the axle, the springs D, clipped to the axle and having cross-bars E, the body F, secured to the cross-bars and extending down and forward between and independent of the shafts, and the supports or braces G, bolted to the cross-bars E of the springs and to the forward lower portion of the body F, substantially as and for the purpose herein described.

2. In a two-wheeled vehicle, the combination of shaft C, bent as shown and rigidly secured to the axle, the seat-supporting springs D, clipped to the axle, and connecting-links I, pivoted to the springs and to the shafts, substantially as and for the purpose herein described.

3. In a two-wheeled vehicle, the arrangement and combination of the shafts C, bent as shown and clipped to the axle, the springs D, with the cross-bars E, body F, secured to said bars, supports or braces G, bolted to the bars and to the lower forward end of the body, and the pivoted or journaled connecting-links I, joining the springs with the shafts, substantially as herein described.

4. In a two-wheeled vehicle, the combination of shafts rigidly secured to the axle, the springs D, clipped to the axle and having adjustable cross-bars E, the body F, hinged, as shown at $m$, to one of the cross-bars and extending down and forward between and independent of the shafts, and the supports or braces G, bolted to both bars E and to the forward lower portion of the body F, substantially as herein described.

In witness whereof I hereto set my hand.

HENRY HORTOP.

Witnesses:
C. D. COLE,
J. H. BLOOD.